United States Patent

Bochmann

[15] 3,665,395

[45] May 23, 1972

[54] METHOD OF DATA TRANSMISSION

[72] Inventor: Karlheinz Bochmann, Munich, Germany

[73] Assignee: Siemens Aktiengesellschaft, Munich, Germany

[22] Filed: June 25, 1968

[21] Appl. No.: 739,683

[30] Foreign Application Priority Data

June 29, 1967 Germany ......................P 15 12 525.4

[52] U.S. Cl. ................................340/146.1, 325/41, 325/56

[51] Int. Cl. ........................................................G08c 25/00

[58] Field of Search ...........................340/146.1; 325/41, 56; 343/204

[56] References Cited

UNITED STATES PATENTS

| | | | |
|---|---|---|---|
| 3,390,335 | 6/1968 | Miyagi | 235/56 |
| 3,195,048 | 7/1965 | Adams et al. | 340/146.1 X |
| 3,335,409 | 8/1967 | Heller et al. | 340/146.1 X |
| 3,409,875 | 11/1968 | De Jager et al. | 340/146.1 |

*Primary Examiner*—Charles E. Atkinson
*Attorney*—Birch, Swindler, McKie & Beckett

[57] ABSTRACT

A method of transmitting data over connection paths subject to signal distorting influences wherein the transmitted message signals comprise parity bits interspersed according to a predetermined ratio with the individual information bits comprising the message signal. The message signals are transmitted in the form of two time spaced transmission signals of the above described type in different frequency channels.

3 Claims, 3 Drawing Figures

METHOD OF DATA TRANSMISSION

CROSS REFERENCE TO RELATED APPLICATION

Applicant claims priority from corresponding German patent application Ser. No. P 15 12 525,4 filed June 29, 1967.

BACKGROUND OF THE INVENTION

1. Field of the Invention

The invention relates to a method of data transmission wherein transmitted message signals are subject to distorting influences. A combination of frequency multiplexing and time spacing techniques are employed to provide for correction of distorted bits without the need to use automatic call-back systems and repeat demand signals.

Description of the Prior Art

The prior art teaches the use of automatic call-back systems to insure that data may be accurately transmitted over connection paths subject to signal distorting influences. Some prior art systems employing the automatic call-back method convert the message signal into a redundant coded signal which is transmitted to the receiving station upon demand. Transmission of the repeat demand signal requires that a full duplex transmission connection path be utilized. Alternatively, if such a path is not available, the transmission path may be used to transmit signals in alternate directions according to the semi-duplex method.

Some connections however provide for only transmission in one direction. For example, service may be provided at movable locations, position of which remains unknown. A path for the repeat demand signal, either simultaneous or alternate with transmission of the message signal therefore does not exist. Further, space or power limitations may limit the number of transmission paths available. Also, where one transmitting station transmits signals to a plurality of receiving stations, the automatic call-back method cannot be employed because receiving conditions normally differ among the plurality of receiving stations.

Various methods have also been employed to recreate distortion-free message signals at the receiving station. These normally require the utilization of suitable codes, time spacing of information bits comprising the message signal, or time diversity methods.

A method is also known wherein error correcting codes are used in conjunction with message signals comprising time-spaced information bits or steps. This serves to distribute the distortions in such a way that they occur in a more random manner, whereby most of the distortions affect only that many bits or steps which can be corrected. Therefore this method can only be employed successfully in conjunction with error recognizing or error correcting codes, of which only the latter are suitable for forward-correction. Of course, information bits or steps corresponding to a first transmitted signal may be interposed between successive bits or steps of a second message signal in order to obtain the maximum step speed.

Some types of transmissions result in a relatively large degree of distortion. In short wave connections, distorting influences having a time duration in the magnitude of seconds may be present. Therefore relatively large storage capacities must be provided at the transmitting and receiving ends to insure transmission of accurate message signals. For example, to transmit telegraph signals, each signal must be spaced over the range of 6 to 10 seconds, depending upon the particular code employed. If an input step speed of 50 Bd is employed, storage systems capable of storing 240 to 480 steps are required at the transmitting and receiving ends in order to collect the steps corresponding to a particular message signal. Such storage capacity devices are expensive, and therefore the prior art methods heretofore discussed are disadvantageous to use.

Transmission systems are known in the prior art wherein the same message is transmitted over separate channels in a time-spaced relationship one to the other. When said time-spaced signals reach the receiving portion of the data transmission system, the time displacement between the two signals is removed so that the corresponding bits of information in the two signals are in coincidence. A comparator means is provided whereby the two signals are compared, bit by bit. A time measuring system, controlled by the comparator circuit is provided to control a switching system which collects the signal on one of the channels and switches it through to the output of the system. This prior art data transmission system detects only disturbances which fulfill certain time conditions as determined by the time measuring system. Therefore, the system achieves only a low transmission reliability when the transmission path is subject to heavy disturbances, in particular group disturbances.

SUMMARY OF THE INVENTION

These and other defects of prior art data transmission methods are solved by the present invention which enables error recognition and correction systems at the receiving end to provide distortion-free message signals. Individual message signals are transmitted in the form of two distinct transmission signals, each comprising coded information wherein parity bits are interspersed according to a predetermined ratio with individual information bits comprising the message signal. The two transmission signals are transmitted in individual channels having different frequencies, the two transmission signals being time spaced.

The combination of frequency and time spacing techniques counterbalances the unfavorable increase in step speed associated with the multi-path spreading effects accompanying a solely time diversity method. Further, distortions in the message signals are countered very effectively by time spacing the two transmission signals thereby minimizing the storage capacity requirements at the transmitting and receiving ends.

DETAILED DESCRIPTION OF THE INVENTION

Figure 1:
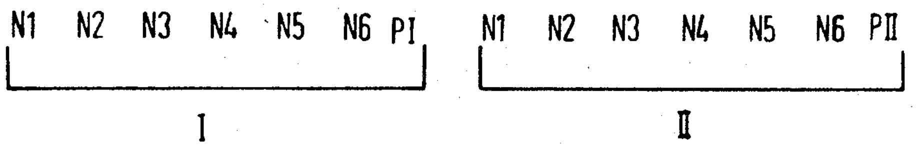
FIG. 1 is a table showing fixed data information groups having associated parity bits at the end of the message signal.

FIG. 1 shows a method of transmitting message signals in the form of data information groups I and II, each consisting of a plurality of information bits N1 through N6. After information bits N6, parity bits P1 and P2 are transmitted, depending upon the polarity of the corresponding six preceding information bits. Thus, each data information group has a length determined by a total of seven bits, and the parity bit is not transmitted until all of the information bits comprising the message signal are transmitted.

Figure 2:
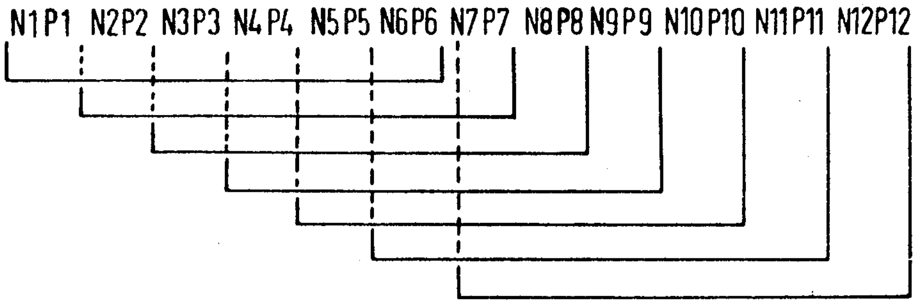
FIG. 2 is a table illustrating the transmission method employed in the invention, wherein the parity bits are interspersed according to a predetermined ratio and sequence with the individual information bits comprising the message signal.

FIG. 2, on the other hand, shows a different method of transmitting message signals used in the method according to the invention in which parity bits are interspersed within the information bits comprising a particular message signal according to a predetermined ratio and sequence. FIG. 2 illustrates the transmission of alternate message and parity bits. Each parity bit is formed from a predetermined number of preceding information bits, and each information bit N1 through N12 contributes to the formation of a plurality of parity bits. For example, for the formation of parity bit P6, message bits N1 through N6 are used; for the formation of parity bit P7, message bits N2 through N7 are used; for the formation of parity bit P8, message bits N3 through N8 are used; etc.

The brackets drawn between the bits illustrated in FIGS. 1 and 2 indicate the number of message bits that are required for the formation of the last parity bit contained within the brackets. Therefore the fixed data information group length obtained by utilizing the transmission method shown in FIG. 1, does not result when the transmission method shown in FIG. 2 is used. The transmission method shown in FIG. 2 provides instead for the encoding of message signals by using selected ratios of parity bits interspersed within the information bits comprising the message signal. Therefore various codes may be employed. For example, the ratio of information bits to parity bits transmitted may be 4:1, 5:2, etc. Depending upon the number of message bits from which a parity bit is formed, the number of correctable bits according to the invention for the information bit to parity bit ratio of 1:1 is shown by the following table:

| A | B = 2.A | C |
|---|---|---|
| 6 | 12, | 2 |
| 12 | 24 | 3 |
| 22 | 44 | 4 |
| 34 | 68 | 5 |
| 52 | 104 | 6 |

The first column (A) indicates the number of information bits used to form a parity bit. The second column (B) indicates the total number of information and parity bits comprising a particular data information group, assuming the type of transmission consisting of alternate information and parity bits shown in FIG. 2 is utilized. The third column (C) indicates the number of correctable bits within the total number of bits indicated in the corresponding row of column (B).

The transmission method employed according to the invention involves simultaneous application of frequency and time spacing techniques. Thus the message signal is transmitted as a first transmission signal in a first channel at a first frequency, and the same message signal is transmitted as a second transmission signal in a second channel at a second frequency that is different from the first frequency. Additionally, the first and second transmission signals are time spaced. Simultaneous application of frequency multiplexing and time spacing techniques counterbalances the unfavorable increase in step speed associated with the multipath spreading effects accompanying solely time diversity methods. Distortion in the data information groups is countered very effectively by the time spacing of the two transmitted signals. Therefore the storage capability requirements at the transmitting and receiving ends are considerably lessened compared to prior art methods wherein the transmission path is shared on a time basis by the transmitted signals.

Any remaining distorted steps are recognized and eliminated through the transmission method shown in FIG. 2, wherein the parity bits are interspersed with the individual information bits comprising the message signal. For example, according to the technique shown in FIG. 2, two out of each group of 12 steps can be corrected with conventional apparatus at minimal expenditure, without the need for employing a simultaneous or alternate call-back transmission path for repeat demands. The combination of the described frequency multiplexing and time spacing techniques further functions to effectively counter permanent frequency selective distortions, and time limited but broad-band distortions. Thus the invention encompasses a method which comprises the utilization of frequency multiplexing and time spacing techniques in conjunction with the transmission of parity bits interspersed according to a selected ratio with individual information bits comprising the message signal. The interspersion technique of transmission further provides for the possibility of forward-correction.

Hamming distance $d$ is a measure of the relative efficiency of different codes. It indicates at how many places any two code signals pertaining to the same code are separated by the minimum time interval. Codes with a hamming distance $d=4$ provide, in addition to the correction of simply distorted signals, for the ascertaining of double errors. However, codes having a hamming distance of $d=4$ cannot provide for the reconstruction of double distorted signals. Instead, a "smear signal" must be given to indicate the distortion.

If the hamming distance is increased to $d=5$, single and double step distorted bits can be corrected. However the circuits required for such correction at the receiving end are normally expensive, with the exception of transmission systems employing the interspersion of parity bits within the individual information bits comprising a message signal described with relation to FIG. 2. Additionally, this type of transmission technique provides the advantage that it can be used with codes of any type and time duration, whereby redundancy approaches 50 percent.

The first example in the table wherein six information bits are used to form a parity bit is particularly advantageous because two correctable bits out of the total number of 12 bits are obtained. The hamming distance of this particular transmission method is therefore equal to 5.

The transmission method disclosed in FIG. 2 does not impose a limit in regard to the extent of the transmitted code. Switching arrangements to carry out the method disclosed as the invention, as well as devices to recognize and correct distorted bits are well known in the art. An exemplary system will be described, however, in conjunction with FIG. 3.

The transmission of message signals according to the method of the invention thus occurs in two channels of different frequency and the two transmission signals are time spaced. The amount of time spacing depends upon the particular interspersion ratio employed. In order to be able to accurately compare the two time spaced sets of transmission signals, it is necessary at the receiving end to synchronize application of the two transmission signals to the comparison device. The time spacing at the transmission end and the synchronization at the receiving end of the transmission signals can be accomplished with shift registers or delay line links, for example.

Figure 3:
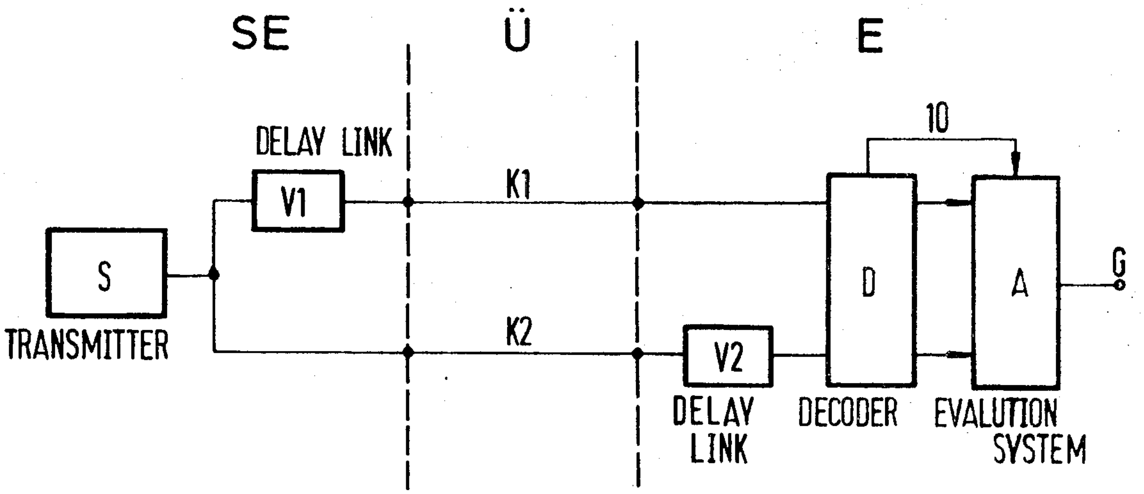
FIG. 3 is a block diagram of an exemplary system for carrying out the method of this invention.

Referring to FIG. 3 wherein is shown a block diagram of a transmission system SE, a transmitter S functions in the conventional manner to transmit a data signal having information bits and parity bits. The transmitted signal is encoded so that the parity bits are interspersed with the information bits according to a predetermined ratio and sequence, as described hereinabove. The transmitter S in fact generates two separate trains of signals, each of said trains have the same arrangement of information bits and parity bits. Two separate frequency transmission channels K1 and K2 are provided. The first train of signals is passed through a delay means, which may be a conventional shift register or a conventional delay line or the like, into channel K1 of the message path U. The second train of signals is coupled to channel K2 with no delay being interposed for transmission thereover.

At the receiving end, the transmission signals are decoded and evaluated. The evaluation circuit commutates between distorted and undistorted channels, and the decoding circuit corrects any remaining bits found to be unacceptably distorted. In effect, the receiving end selects which of the transmission signals is the least distorted and processes it to the exclusion of the other transmission signal. The signals received over channels K1 and K2 are demodulated in decoder D by a circuit which may be constructed in a manner described for the construction of a similar demodulation circuit in U.S. Pat. No. 3,409,875. Of course, any of the known demodulating circuits of this type may be used. Thus, the pulsating signals are essentially converted to direct current signals, as described in the latter patent. Utilizing this demodulated signal, the decoder D can produce directly reconstructed information and transmit to evaluation system A over line 10, information as to defects in the two trains of signals, i.e., the probability of reconstruction of said signals. The portion of decoder D which can accomplish the latter functions may be constructed in a manner described in U.S. Pat. No. 3,402,393, and particularly, FIGS. 2 and 3 therein. The reconstructed information from the two channels emitted by decoder D is applied to evaluation circuit A. This circuit, utilizing information available from line 10, switches the least distorted of the two signals through output G of the system.

The term least distorted refers to that signal which, in fact, contains the least distortion or which affords the greater probability of correct reconstruction.

The invention provides a transmission method which has an equal or higher degree of distortion -free transmitted signals compared to the prior art, while requiring a relatively reduced storage capacity at the receiving and transmitting ends. Further, correction of the bits takes place at the receiving end without the necessity that the receiving end transmit a repeat demand signal back to the transmitting end in the event that distorted signals are received.

What is claimed is:

1. A method for communicating data signals comprising information bits and parity bits over data transmission systems having transmitting and receiving ends where said data signals are subject to distortion therebetween, comprising the steps of:

encoding said data signals by interspersing said parity bits within said information bits comprising the data signal according to a predetermined ratio and sequence and forming therefrom first and second similarly encoded trains of signals, displacing said first train of signals in time relative to said second train of signals, transmitting said first train of signals over a first frequency channel, transmitting said second train of signals over a second frequency channel, displacing said second train of signals in time such that the corresponding individual bits constituting said first and second trains of signals, respectively, are in timed coincidence, applying in coincidence the corresponding bits of said first and second trains of signals to a decoder at the receiving end of said system to derive first and second trains of decoded signals, evaluating said first and second trains of signals to determine from said coding which of said first and second trains is least distorted, applying to the output of said system that train of signals which is least distorted, and reconstructing, thereafter, any distorted bits in said least distorted train of signals.

2. The method according to claim 1 wherein said time displacements of said first and second trains of signals are accomplished by applying said first and second trains, respectively, to first and second shift registers having like characteristics.

3. The method according to claim 1 wherein said time displacements of said first and second trains of signals are accomplished by applying said signals, respectively, to first and second delay lines having like characteristics.

* * * * *